3,151,938
PHOSPHATIC MATERIALS AND METHODS FOR
THE PRODUCTION THEREOF
Murry Seidman, Northbrook, Ill., assignor to International
Minerals & Chemical Corporation, a corporation of
New York
No Drawing. Filed Apr. 25, 1961, Ser. No. 105,394
10 Claims. (Cl. 23—109)

This invention generally relates to the production of various phosphatic materials from phosphate rock. In a particular aspect it relates to the defluorination of inorganic, acidic phosphatic solutions obtained from acidulated phosphate rock. In another aspect it relates to the production of feed grade dicalcium phosphate from phosphate rock.

There has developed in recent years a substantial market for calcium phosphates of a grade and quality useful as an animal feed supplement. In such feed grade calcium phosphates, the weight ratio of phosphorus, calculated as elemental phosphorus, to fluorine, calculated as elemental fluorine, is preferably greater than about 50, and still more preferably greater than about 100.

Feed grade phosphates, such as, inter alia, calcium phosphates, sodium phosphates, and potassium phosphates, may be produced directly from acidic phosphatic solutions provided the fluorine content of the solution is not too high. However, inasmuch as phosphate rock in the natural state contains significant amounts of fluorine, acidic phosphatic solutions prepared from phosphate rock also contain significant amounts of fluorine and, accordingly, phosphates prepared from such solutions will contain significant amounts of fluorine.

The prior art has proposed the defluorination of solutions of fluorine-containing phosphatic solutions, such as acidulated phosphate rock extracts, by addition thereto, inter alia, of alkali metal ions, preferably in the form of solutions of alkali metal salts, such as sodium and potassium chlorides, and the like, to form precipitates containing the fluorine. However, such alkali metal defluorination processes have presented operational problems and have not been altogether satisfactory for producing a defluorinated extract or solution from which a phosphate product of animal feed grade can be produced directly.

It is, accordingly, an object of this invention to provide a method for defluorinating acidic phosphatic solutions containing significant amounts of fluorine.

It is another object of the present invention to provide a method for the production of feed grade dicalcium phosphate from phosphate rock.

It is a further object of the invention to provide a process for the calcium defluorination of aqueous solutions of fluorine-containing phosphatic materials.

These and other objects and advantages of the present invention will be apparent from the specification.

In accordance with the present invention there is provided a process for defluorinating an aqueous solution of acidic phosphatic material containing fluorine and having a pH below about 1.5 which comprises increasing the pH of said solution to at least 1.8 and establishing in the resultant solution a Ca:F mole ratio of at least 1:2 and a temperature of at least about 175° F., separating solids from the resultant admixture and recovering a substantially solids-free phosphatic solution of substantially reduced fluorine content.

In a further embodiment of the invention the substantially solids-free phosphatic solution of substantially reduced fluorine content is admixed with calcium ions to precipitate dicalcium phosphate therefrom.

The invention generally finds utility in conjunction with processes which entail acidulation of phosphate rock to solubilize the phosphate values and separation of the solubilized phosphate values from the insoluble materials. The solubilized phosphate values are generally extracted from the acidulated phosphate rock with an aqueous medium and the phosphate-rich extract is processed to produce a high analysis fertilizer or a feed grade dicalcium phosphate, or both. A representative process of the general type is described in Le Baron Patent No. 2,722,472, November 1, 1955, and Manning et al. Patent No. 2,976,119, March 21, 1961.

The invention finds particular utility in defluorinating aqueous acidic phosphatic solutions formed from phosphate rock acidified with hydrochloric acid, although it is also applicable in defluorinating aqueous acidic phosphatic solutions formed from phosphate rock acidified with other strong mineral acids such as sulfuric acid, nitric acid, or mixtures of these acids with hydrochloric acid or with each other. When sufficient acid is used so that a slurry results when the phosphate rock is acidified, the process of the invention may be effected directly on the slurry, or, if desired, the slurry may first be treated by a suitable separation process such as, inter alia, centrifugation, or filtration, to produce a substantially solids-free acidic phosphatic solution containing an objectionable amount of fluorine which is then treated in accordance with the present invention. The aqueous acidic phosphatic solution may also be formed by extracting acidulated phosphate rock with an aqueous medium.

Accordingly, the aqueous acidic phosphatic solution which is treated in accordance with the present invention may contain solids or may be substantially solids-free. The aqueous acidic phosphatic solution may constitute phosphoric acid, or depending upon the degree of acidulation, approach monocalcium phosphate solution characterized by a $CaO/P_2O_5$ mole ratio of about 1:1. The invention is useful in the reduction of fluorine in all such solutions and more specifically is applicable to aqueous acidic phosphatic solutions ranging from phosphoric acid to monocalcium phosphate. The invention finds particular application to acidic phosphatic solutions having a pH below about 1.5 and a P/F weight ratio below about 15.

The present invention accordingly contemplates acidulating particulate phosphate rock with hydrochloric acid in an amount requisite to convert substantially all of the phosphate values in the rock into water soluble form and agitating or slurrying the acidulated rock in an aqueous medium. Concentrated hydrochloric acid is preferably used although less concentrated acid may also be used. The resultant slurry preferably has a pH below about 1.5 and more preferably below about 1.0. The slurry may be treated with a basic compound to raise the pH to at least 1.8 at this stage of the process, or the slurry may first be filtered or centrifuged to recover a substantially solids-free acidic phosphatic solution containing fluorine and dissolved calcium chloride which is then treated with the basic compound.

A threshold problem incident to the production of feed grade phosphates from such acidic phosphatic solutions, which have a P/F ratio of below about 15, centers around the reduction of the fluorine content thereof to a degree requisite to the production of feed grade phosphate which should have an elemental phosphorus to elemental fluorine weight ratio above about 50, preferably above about 100.

It has now been discovered, and the present invention is in part based on this discovery, that when an aqueous acidic phosphatic solution containing fluorine in an amount which renders it unsuitable for use in animal feeds and having a pH below about 1.5 is admixed with a basic compound in an amount requisite to raise the pH to at least 1.8, and the resultant admixture is established at a temperature of at least about 175° F. and a Ca:F mole ratio of at least 1:2, and the resultant admixture is subsequently treated to separate out solids, the resultant substantially solids-free acidic phosphatic solution is of substantially reduced fluorine content and is suitable for use in the manufacture of animal feed grade dicalcium phosphate. When a pH of at least 1.8 is attained and a Ca:F mole ratio of at least 1:2, that is at least one mole of calcium for each mole of fluorine, is established in the solution, solid calcium fluoride, $CaF_2$, precipitates from the solution and the solid $CaF_2$ may be separated from the remaining solution. The remaining solution will, of course, be of reduced fluorine content. The $CaF_2$ may be recovered as a product of the process. The resultant solution will have a P/F weight ratio of at least 50 and the process will produce a solution having a P/F weight ratio above 100. While some defluorination is obtained over a wide temperature range, it has been discovered that when only temperatures below about 175° F. are established in the resultant admixture the degree of defluorination is substantially decreased. An essential feature of the present invention is, therefore, establishing a temperature in the admixture of above about 175° F., more preferably above about 200° F., and still more preferably the boiling point is established. When the admixture is boiled it has been determined that highly efficient defluorination is effected and dicalcium phosphate produced from the defluorinated material will have a P/F ratio of at least 100.

Any suitable basic compound may be used to increase the pH of the acidic phosphatic solution from below about 1.5 to at least 1.8. Sodium carbonate, potassium carbonate, sodium hydroxide, potassium hydroxide, ammonia, ammonium hydroxide, as well as other alkali metal basic compounds may be used. Basic calcium compounds are specifically preferred. Specific compounds include, inter alia, inorganic oxygen-containing basic calcium compounds, such as calcium oxide, calcium hydroxide, and calcium carbonate as well as mixtures thereof. The amount of basic compound is sufficient to raise the pH of the acidic aqueous phosphatic solution, which has a pH below about 1.5, to at least 1.8. It is preferred that the amount of basic compound added raises the pH from below about 1.5 up to a pH within the range of from about 1.8 to about 2.5. An amount of basic compound may be added to establish a pH above about 2.5, however, at pH's above about 2.5 dicalcium phosphate begins to precipitate from the solution. Therefore, the precipitate would contain the fluorine impurities and dicalcium phosphate. This is generally undesirable since the $P_2O_5$ values in the precipitated dicalcium phosphate would be lost or the precipitate would have to be treated to recover the $P_2O_5$ values.

In accordance with the invention the admixture of basic compound and acidic inorganic phosphatic solution is established at a Ca:F mole ratio of at least 1:2 and at a temperature above about 175° F. The acidic phosphatic solution usually contains sufficient calcium compound to give a Ca:F mole ratio of at least 1:2, however, a calcium compound may be added if desirable or necessary to achieve this ratio. The calcium compound is preferably one of the inorganic oxygen-containing basic calcium compounds hereinbefore set forth. When a calcium compound is added it may be added at any suitable stage of the process. At a temperature of at least 175° F. and a Ca:F ratio of at least 1:2, the calcium reacts with the fluorine to form a fluorine-rich precipitate which can be separated as by filtration, decantation, or the like, from the defluorinated liquor. Temperatures above the normal boiling point of the solution at atmospheric pressure may be used by providing superatmospheric pressure, however, temperatures above the normal boiling point are not usually considered to be economically practical. The acidic inorganic phosphatic solution may be mixed with the basic compound to obtain an admixture having a temperature below 175° F. and the admixture then heated, or the acidic solution may be at a sufficiently high temperature so that the admixture will have a temperature above 175° F., in which case it will not be necessary to further heat the admixture although it is preferred to boil the admixture for at least 5 minutes.

The particular degree of acidulation of the phosphate rock from which the aqueous extracts of fluorine-containing phosphatic materials are derived is not a critical feature of this aspect of the invention, except that the resulting acidic phosphatic solution obtained should have a pH below about 1.5 and preferably below about 1.0. Phosphate rock can be acidulated to any desired degree with any desired mineral acid, such as sulfuric acid, phosphoric acid, hydrochloric acid, or nitric acid, or mixtures thereof effective to convert the phosphate values in the rock to water-soluble form. It is contemplated, of course, that the acidulating acid will be employed in an amount sufficient to convert the predominant amount of the phosphate values present in the rock to water-soluble phosphate compounds, such as monocalcium phosphate or phosphoric acid, or mixtures thereof. The acidulation process described in the preceding portions hereof can appropriately be employed to produce suitable phosphate solutions.

After removing the fluorine-containing precipitate, the substantially defluorinated acidic phosphatic solution will have a P/F weight ratio of at least 50 and is suitable for use in the preparation of an animal feed supplement and/or a fertilizer material therefrom. Any suitable method may be used to prepare an animal feed supplement and/or a fertilizer from the defluorinated solution. It is preferred to add a basic calcium compound to the defluorinated solution in at least an amount sufficient to convert a substantial amount of the phosphate values in the solution into dicalcium phosphate which precipitates from the solution and may be recovered by any suitable separation method such as decantation, filtration, centrifugation, etc. The separated precipitate may be dried and recovered as a product of the process or may be otherwise treated as desired. Any suitable basic calcium compound may be used to precipitate the dicalcium phosphate, such as calcium oxide, calcium hydroxide, calcium carbonate and mixtures thereof.

The phosphates precipitated from the defluorinated solutions have high availability and a P/F above 50 and more preferably above 100 and are eminently suitable for use as an animal feed supplement although they may also be used as a fertilizer material.

In order to give a fuller understanding of the invention, but with no intention to be limited thereto, the following specific example is given.

*Example*

Terteling, Idaho, phosphate rock (−28 +200) mesh which had been crushed and water washed was used as the raw material. To 100 grams of the phosphate rock and 335 ml. of $H_2O$ was added 135 ml. of 33% technical grade HCl. This mixture was stirred for ½ hour, then 40 ml. $H_2O$ and 12 grams of $CaCO_3$ were added slowly. The reaction mixture which had a P/F weight ratio below 15 was then heated to boiling (about 215° F.) and an additional 6 grams of $CaCO_3$ was added slowly. The heat was then removed and the mixture was stirred for ½ hour. The mixture which had a pH of 2.0 was then filtered and the residue was washed with 25 ml. $H_2O$. The residue weighed 22.8 grams.

To the combined filtrate and wash water which had a P/F weight ratio above 50 was added 26.4 grams of $Ca(OH)_2$ and the resultant slurry was stirred for 2 hours. The white precipitate of dicalcium phosphate was collected by filtration, washed with water and dried. Upon analysis the product was found to contain 0.11% F, 43.7% $P_2O_5$ and 42.5% CaO. The P/F ratio was calculated to be 173 and the recovery of $P_2O_5$ values in the product based on the amount in the phosphate rock was 86.4%. The product represented a high recovery of $P_2O_5$ values and was suitable for use as an animal feed supplement.

In another test the above procedure was followed except that after adding the 12 grams of $CaCO_3$, the reaction mixture was not heated to boiling but was permitted to attain an ambient temperature of about 80° F. The final product dicalcium phosphate contained 0.38% F and had a P/F ratio of 41.

The above example illustrates that when following the procedure of the present invention effective defluorination of the aqueous acidic solution is achieved and a dicalcium phosphate product suitable for use as an animal feed supplement is produced.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A process for defluorinating an aqueous solution containing phosphatic materials of the group consisting of phosphoric acid, monocalcium phosphate, and mixtures thereof and also containing fluorine in an amount sufficient to provide a P/F weight ratio below about 15, said solution having a pH below about 1.5, which comprises adding to said solution a compound of the group consisting of calcium oxide, calcium carbonate, calcium hydroxide, and mixtures thereof in an amount sufficient to increase the pH of said solution to within the range of about 1.8 to about 2.5 and to establish in the resulting solution a Ca/F mole ratio of at least 1/2, maintaining said solution at a temperature in the range of 200° F. to the boiling point of said solution, separating solids comprising calcium fluoride from the resulting admixture and recovering a substantially solids-free acidic, inorganic, phosphatic solution of reduced fluorine content having a P/F weight ratio of at least 50.

2. A process for producing a solid dicalcium phosphate animal feed supplement having a P/F weight ratio of at least 50 from an aqueous solution of phosphatic materials of the group consisting of phosphoric acid, monocalcium phosphate, and mixtures thereof and also containing fluorine in an amount sufficient to provide a P/F weight ratio below about 15, said solution having a pH below about 1.5, which comprises adding to said solution a compound of the group consisting of calcium oxide, calcium carbonate, calcium hydroxide, and mixtures thereof in an amount sufficient to increase the pH of said solution to within the range of about 1.8 to about 2.5 and to establish in the resulting solution a Ca/F mole ratio of at least 1/2, maintaining said solution at a temperature in the range of 200° F. to the boiling point of said solution, separating solids comprising calcium fluoride from the resulting admixture, recovering a substantially solids-free phosphatic solution of reduced fluorine content having a P/F weight ratio of at least 50, then admixing a basic calcium compound of the group consisting of calcium oxide, calcium carbonate, calcium hydroxide, and mixtures thereof with said recovered phosphatic solution in an amount sufficient to precipitate phosphate values in said solution as dicalcium phosphate, and recovering dicalcium phosphate precipitate having a P/F weight ratio above 50.

3. The process of claim 1 wherein said aqueous solution of acidic phosphatic material containing fluorine comprises wet process phosphoric acid having a pH below about 1.0.

4. The process of claim 1 wherein said resultant solution is heated at the boiling point for at least 5 minutes.

5. The process of claim 1 wherein said basic calcium compound comprises calcium oxide.

6. The process of claim 1 wherein said basic calcium compound comprises calcium carbonate.

7. The process of claim 1 wherein said basic calcium compound comprises calcium hydroxide.

8. The process of claim 2 wherein said basic calcium compound added to the substantially solids-free phosphatic solution comprises calcium carbonate.

9. The process of claim 2 wherein said basic calcium compound added to the substantially solids-free phosphatic solution comprises calcium oxide.

10. The process of claim 2 wherein said basic calcium compound added to the substantially solids-free phosphatic solution comprises calcium hydroxide.

References Cited in the file of this patent

UNITED STATES PATENTS

| | | |
|---|---|---|
| 2,312,047 | Ogburn | Feb. 23, 1943 |
| 2,722,472 | Le Baron | Nov. 1, 1955 |
| 2,759,795 | Archer | Aug. 21, 1956 |
| 2,767,045 | McCullough | Oct. 16, 1956 |
| 2,948,589 | Gilchrist | Aug. 9, 1960 |
| 2,976,119 | Manning et al. | Mar. 21, 1961 |